United States Patent
Lee et al.

(10) Patent No.: US 7,782,222 B2
(45) Date of Patent: Aug. 24, 2010

(54) VOLTAGE REGULATING POWER SUPPLY FOR NOISE SENSITIVE CIRCUITS

(75) Inventors: Ming-Han Lee, Taipei Hsien (TW); Tzung-Ming Chen, Taipei (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 783 days.

(21) Appl. No.: 11/307,958

(22) Filed: Feb. 28, 2006

(65) Prior Publication Data
US 2007/0200542 A1    Aug. 30, 2007

(51) Int. Cl.
*G08B 23/00* (2006.01)
(52) U.S. Cl. ............ 340/693.4; 323/304; 341/119
(58) Field of Classification Search .......... 340/693.4, 340/572.8, 10.34; 323/304; 341/119
See application file for complete search history.

(56) References Cited

U.S. PATENT DOCUMENTS

| | | | | |
|---|---|---|---|---|
| 4,186,342 A | * | 1/1980 | Kyle ........................ 455/76 |
| 4,219,762 A | * | 8/1980 | Gilbert ..................... 315/364 |
| 4,484,355 A | * | 11/1984 | Henke et al. ................ 455/76 |
| 5,592,072 A | * | 1/1997 | Brown ..................... 323/268 |
| 6,661,210 B2 | * | 12/2003 | Kimball et al. ............. 323/268 |
| 2002/0188875 A1 | * | 12/2002 | Hwang et al. ............... 713/300 |
| 2005/0285575 A1 | * | 12/2005 | Kim et al. .................. 323/234 |
| 2006/0229024 A1 | * | 10/2006 | Vishakhadatta ............. 455/69 |
| 2006/0290547 A1 | * | 12/2006 | Hazucha et al. ............. 341/119 |
| 2007/0024360 A1 | * | 2/2007 | Markowski .................. 330/123 |
| 2007/0188139 A1 | * | 8/2007 | Hussain et al. .............. 320/128 |
| 2007/0200539 A1 | * | 8/2007 | Ganti et al. ................. 323/282 |
| 2007/0236197 A1 | * | 10/2007 | Vo ............................ 323/282 |
| 2007/0279024 A1 | * | 12/2007 | Falvey et al. ................ 323/280 |

FOREIGN PATENT DOCUMENTS

| TW | 552769 | 9/2003 |
|---|---|---|
| TW | I237436 | 8/2005 |

* cited by examiner

*Primary Examiner*—Davetta W Goins
*Assistant Examiner*—Edny Labbees
(74) *Attorney, Agent, or Firm*—Winston Hsu

(57) ABSTRACT

A voltage regulating power supply includes: a switching regulator powered by a supply voltage level, the switching regulator for generating a first output voltage in accordance to a first reference voltage; and a linear regulator coupled to the first output voltage, the linear regulator for generating a second output voltage in accordance to a second reference voltage; wherein a noise sensitive circuit draws power from the second output voltage.

23 Claims, 4 Drawing Sheets

VOLTAGE REGULATING POWER SUPPLY FOR NOISE SENSITIVE CIRCUITS

BACKGROUND OF THE INVENTION

1. Field of the Invention

The present invention relates to power converters and voltage regulators, and more particularly, to a switching and linear voltage regulator for providing power to a noise sensitive circuit.

2. Description of the Prior Art

Voltage regulators are basic building blocks used in electronic circuit design, and are commonly found in many applications including laptop computers, personal digital assistants (PDAs), cell phones, cable modems and battery-operated electronic devices. Voltage regulators are used to provide and maintain a constant DC output source regardless of changes in load current and input voltage (assuming the values stay within the specification of the regulator). Because most electronic circuits are designed to operate at a constant supply voltage, the use of a voltage regulator is critical to ensure proper operation of the electronic device. A voltage regulator can also help protect a circuit from variations in input voltage, temperature, and load impedance.

Although there are many types of voltage regulators in existence, many of which cater to a specific application, most voltage regulators fall to within one of two categories, linear and switching.

FIG. 1 displays a typical block diagram of a linear regulator 100, generally the most common type of voltage regulators. The linear regulator 100 makes use of a voltage controlled current source 140 to force a fixed voltage across an output terminal 120. An input voltage 110 is applied to the regulator 100, while a control circuit is used to monitor the output voltage at output terminal 120, and to adjust the voltage controlled current source 140 to maintain the output voltage according to a reference voltage 130.

Popularity of the linear regulator can be attributed to many things, they are low cost, simple, have low output noise characteristics, and have fast response times to load variations. However, linear regulators are not electrically efficient and can have significant heat losses. This is especially important in devices where battery life is critical, such as cell-phones and portable electronics.

FIG. 2 illustrates a conventional switching regulator 200 of the related art. A basic configuration of this type makes use of a switch 210, a pulse width modulator 220 to control switch 210, and an LC circuit consisting of an inductor 230 and capacitor 240. When switch 210 is turned on, input voltage 250 is forced across inductor 230 resulting in an inductor current. This will, according to the law of inductance, cause the voltage across the inductor to increase with proportion to the rate of current across it. The inductor current acts to charge capacitor 240, and supply current into the output terminal 260. The output voltage is compared to a voltage reference 270, and this feedback is used to vary the pulse width application of power to output 260. In this manner, the circuit acts as a constant current source supplying current into the load. The desired voltage level and ripple can be selected by properly adjusting the frequency of the pulse width modulator 220.

Switching regulators typically possess high efficiencies, are capable of handling high energy densities, and have less heat losses when compared to linear regulators. However, they tend to have higher output voltage ripples and produce more noise and electromagnetic interference. In devices that are sensitive to output noise from power sources (RF communications, wireless devices), this may adversely interfere with device operations.

Therefore, for applications such as RF communications and portable wireless devices, it is desirable to have power supply regulators that have high efficiency, and low output noise to ensure proper device operation and long battery life.

SUMMARY OF THE INVENTION

One objective of the claimed invention is therefore to provide a voltage regulating power supply for noise sensitive circuits to solve the above-mentioned problems.

According to an exemplary embodiment of the claimed invention, a voltage regulating power supply is disclosed for providing power to a noise sensitive circuit. The voltage regulating power supply comprises a switching regulator powered by a supply voltage level, the switching regulator for generating a first output voltage in accordance to a first reference voltage; and a linear regulator coupled to the first output voltage, the linear regulator for generating a second output voltage in accordance to a second reference voltage; wherein a noise sensitive circuit draws power from the second output voltage.

According to another exemplary embodiment of the claimed invention, a voltage regulating power supply is disclosed. The voltage regulating power supply comprises a switching regulator powered by a supply voltage level, the switching regulator for generating a first and a second output voltage in accordance to a first and a second reference voltage respectively; and a linear regulator coupled to the first output voltage, the linear regulator for generating a third output voltage in accordance to a third reference voltage; wherein a noise sensitive circuit draws power from the third output voltage.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
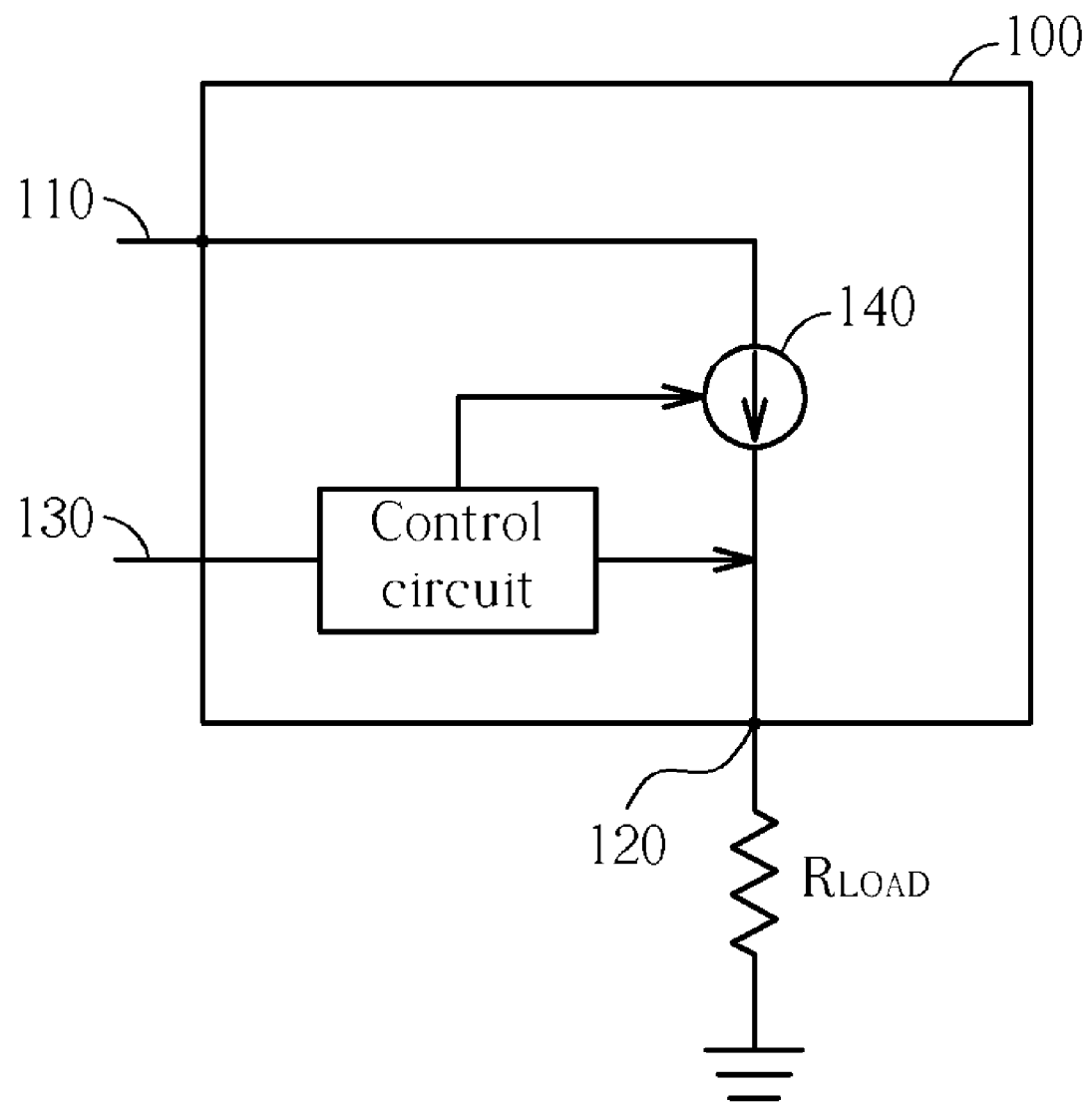
FIG. 1 is a diagram of a linear regulator according to the related art.
Figure 2:
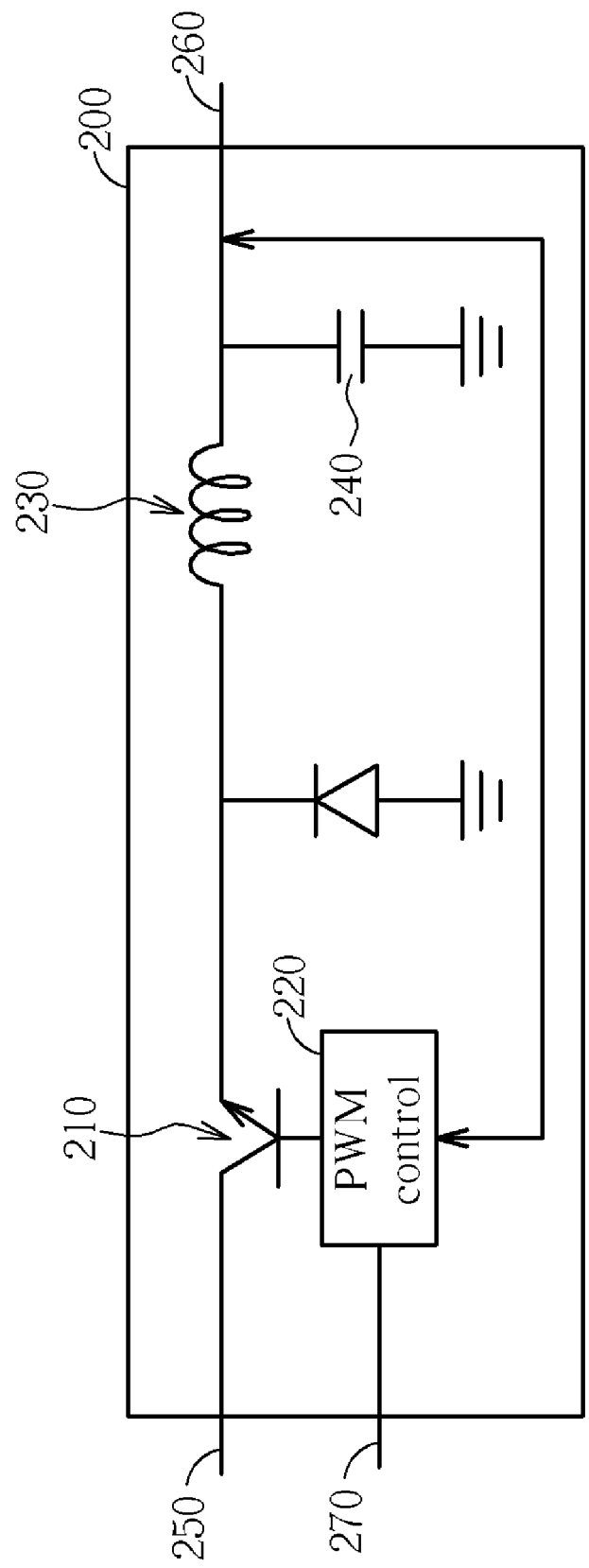
FIG. 2 is a diagram of a switching regulator according to the related art.
Figure 3:
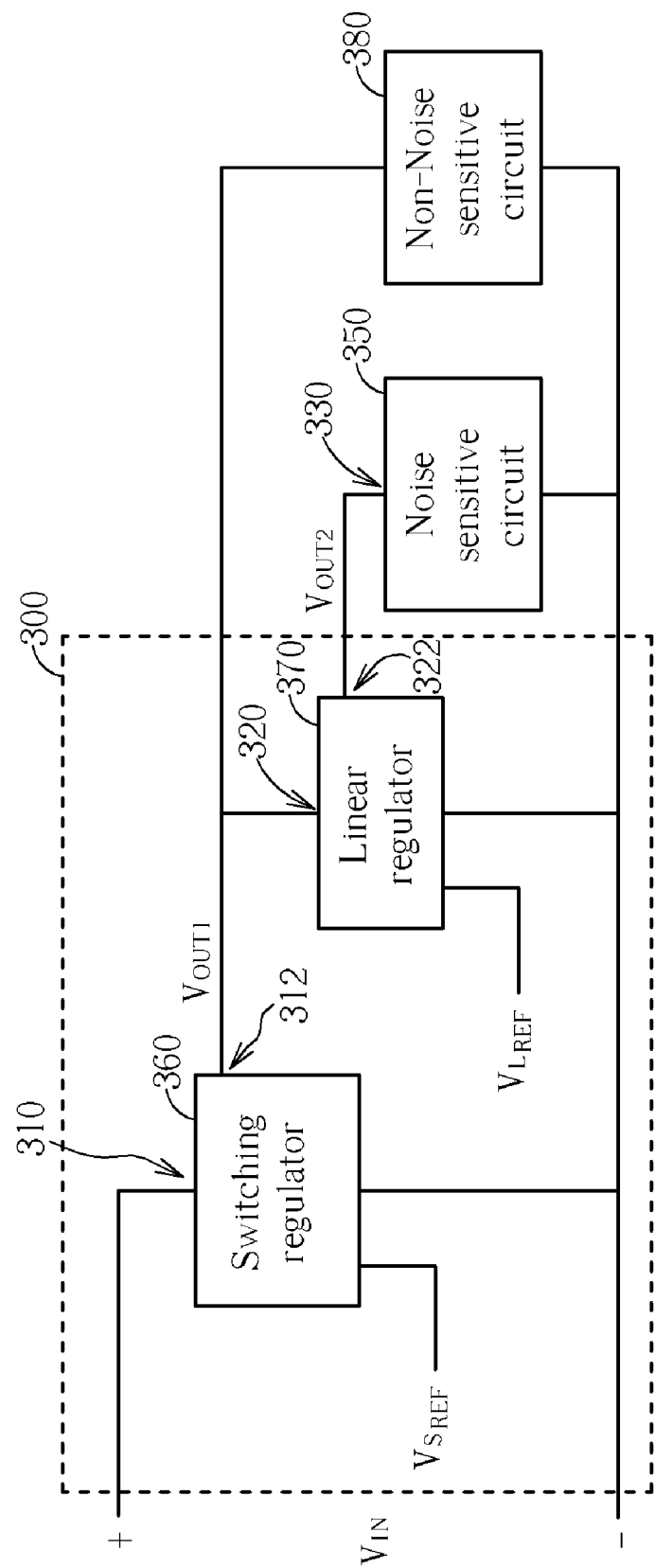
FIG. 3 is a block diagram of a voltage regulating power supply according to a first embodiment of the present invention.

Referring to FIG. 3, a first embodiment of the voltage regulating power supply 300 is shown providing power to a noise sensitive circuit 350 (e.g. high speed ADC, PLL), and a non-noise sensitive circuit 380 (e.g. digital circuit). In this embodiment, the voltage regulating power supply 300 comprises a switching regulator 360 and a linear regulator 370. An input voltage ($V_{In}$) is coupled to the input terminal 310 of the switching regulator 360 to supply the input power. A first output voltage $V_{out1}$ is produced at output terminal 312 of the switching regulator 360, and is in turn coupled to input terminal 320 of linear regulator 370. A second output voltage $V_{out2}$ is produced at output terminal 322 of the linear regulator 370, and is used to power the noise sensitive circuit 350. The power supplied to the non-noise sensitive circuit 380 is given through output voltage $V_{out1}$ from output terminal 312 of switching regulator 360. The switching regulator 360 however, is not limited to providing a single output voltage. Additional output voltages (not shown) can be provided in order to operate a variety of non-noise sensitive circuits 380 at potentially different voltage levels. The additional output voltages also provide independent terminals for which to connect and isolate each individual non-noise sensitive circuit 380. This should be well known to those skilled in the art, and thus is omitted here for brevity.

The input voltage $V_{In}$ coupled to input terminal 310 can be an unregulated DC or line level voltages. Regulated output voltages are provided at each of the outputs 312, 322 of the switching regulator 360 and linear regulator 370 respectively, where the output voltages remain relatively constant. Because the first output voltage $V_{out1}$ is potentially noisy from the internal switching mechanisms of switching regulator 360, the linear regulator 370 follows the switching regulator 360 and is utilized to provide a low noise output voltage $V_{out2}$.

The output voltages at output terminals 312, 322 of switching regulator 360 and linear regulator 370 can be set by supplying reference voltages $Vs_{REF}$ and $VI_{REF}$ respectively. Once the reference voltages $Vs_{REF}$, $VI_{REF}$ for regulators 360, 370 are supplied, the voltage outputs at terminals 312, 322 will mirror the given reference voltages regardless of the load impedance, as long as the operating conditions remain within the specification of regulators 360, 370.

Under normal operation, when linear regulator 370 operates as a step down regulator, it is evident that $V_{out2} < V_{out1}$ due to the expected power losses (active device power consumption, heat loss etc.) from linear regulator 370. $Vs_{REF}$ can be selected such that $V_{out1}$ can provide the desired voltage for peripheral non-noise sensitive circuits 380, and $VI_{REF}$ can be selected such that $V_{out2}$ provides the desired voltage levels to the noise sensitive circuit 350.

In order to make the voltage regulating power supply 300 as energy efficient as possible, one should attempt to minimize the difference between reference voltages $Vs_{REF}$ and $VI_{REF}$ while maintaining $Vs_{REF} > VI_{REF}$. For example, $VI_{REF}$ should be within a predetermined range of $Vs_{REF}$, and the predetermined range is set by the device characteristics and allowable heat dissipation and efficiency for the linear regulator 370. This will allow the switching regulator 360 to manage the bulk of the voltage step-down (or step-up) from the input supply voltage Vin. As previously mentioned, one of the advantages of the switching regulator 360 is its high efficiency and low heat losses. Minimizing the difference between $Vs_{REF}$ and $VI_{REF}$, if possible, will ensure reduced heat losses across the linear regulator 370 and improved overall efficiency of the regulating power supply 300. This is in contrast to having $Vs_{REF} >> VI_{REF}$, which would force the linear regulator 370 to manage the bulk of the voltage step-down to produce the required output voltage $V_{out2}$.

A major advantage in having linear regulator 370 coupled to the noise sensitive circuit 350 is that a linear regulator 370 with good PSSR (power supply rejection ratio) produces low noise levels when compared to the switching regulator 360. The linear regulator 370 also possesses faster response times to load changes, low output ripple, and better load regulation. This is important for noise sensitive circuits, as they are severely affected by these characteristics. From the perspective of the input terminal 330 of the noise sensitive circuit 350, only a connection to the linear regulator 370 is made, not a connection to the switching regulator 360. The noise sensitive circuit 350 is therefore isolated from the potential electrical interference resulting from switching regulator 360.

Figure 4:
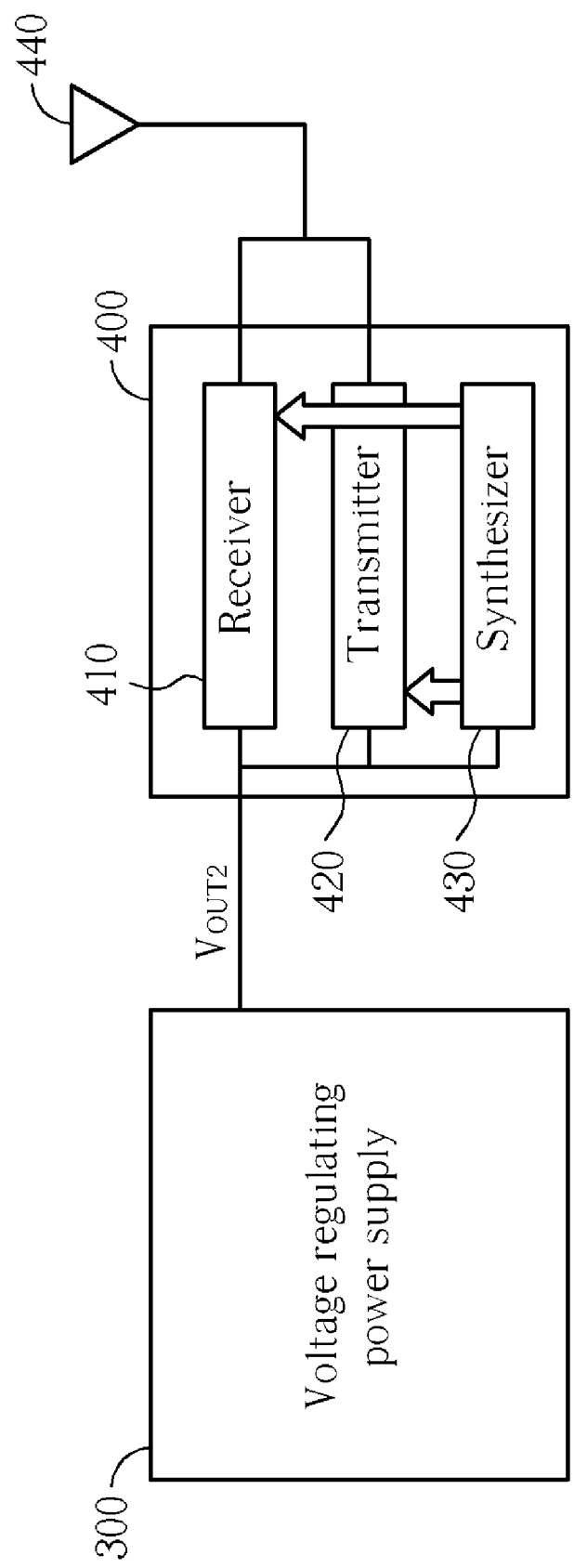
FIG. 4 is a diagram of a voltage regulating power being coupled to a transceiver according to a second embodiment of the present invention.

FIG. 4 shows an alternate embodiment of the voltage regulating power supply 300, where it is connected to a noise sensitive transceiver 400. As mentioned before, for applications such as RF communications and portable wireless devices, it is desirable to have power supply regulators that have high efficiency, and low output noise to ensure proper device operation and long battery life. The present invention is therefore particularly useful for these applications. As shown in FIG. 4, the transceiver 400 comprises a receiver 410, a transmitter 420, a synthesizer 430, and an antenna 440. Output voltage $V_{out2}$ supplies power to the active component blocks of the transceiver 400. The receiver 410 and transmitter 420 are further connected to an antenna 440. The synthesizer 430 is further connected to the receiver 410 and transmitter 420 and is utilized to select the appropriate channel by generating a channel frequency corresponding to the selected channel of the radio frequency (RF) device in order to receive or transmit data. Although the transceiver 400 may contain many other components (not shown), particularly relevant are the transmitter 420, the receiver 410, and the synthesizer 430 as these are the most sensitive components of the transceiver 400. Interference and noise found in the supply voltage may in turn be superimposed onto the received signals of receiver 410, or transmitted by the transmitter 420. Additionally, the synthesizer 430 requires noise free power in order to properly generate an accurate frequency for a selected channel. Therefore, to ensure proper operation of the transceiver 400, one should ensure that the input supply voltages for each of these components remain relatively interference free.

In another embodiment, only the noise sensitive circuit 350 draws power from the second output voltage $V_{out2}$. This is to ensure that output voltage $V_{out2}$ does not receive and become contaminated from noisy circuits, which may be connected in parallel. In the same manner, only the non-noise sensitive circuit 380 draws power from the first output voltage $V_{out1}$. Additionally, the noise sensitive circuit 350 solely draws its power from output voltage $V_{out2}$, and not another peripheral power source, in order to ensure that the supplied power remains noise free.

Yet another embodiment of the voltage regulating power supply 300 comprises the voltage regulating power supply unit being implemented as an integrated circuit 300. This comprises having the switching regulator 360 and the linear regulator 370 internally implemented within the voltage regulating power supply 300 as a single circuit. The switching regulator 360 can be a step-down regulator, such that the value of the second output voltage $V_{out2}$ will be less than the input voltage $V_{in}$ of the voltage regulating power supply 300.

According to the present invention, a voltage regulating power supply for providing power to a noise sensitive circuit is shown. This invention manages to provide power to a noise sensitive circuit, such as an RF transceiver, in a more efficient and noise free manner. By providing a switching regulator 360 for generating a first output voltage in accordance to a first predetermined reference voltage, and a linear regulator 370 for generating a second output voltage in accordance to a second predetermined reference voltage, an arbitrary input voltage $V_{in}$ can be efficiently converted into a desired supply voltage. Additionally, because the actual supply voltage is provided by the linear regulator, the supply voltage is substantially absent of noise. This allows the noise sensitive circuit, such as the RF circuit or transceiver, to accurately perform its operations, and thereby increase the reliability of the overall system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A voltage regulating power supply, comprising:
   a switching regulator powered by a supply voltage level, the switching regulator for generating a first output voltage in accordance to a first reference voltage; and
   a linear regulator coupled to the first output voltage, the linear regulator for generating a second output voltage in accordance to a second reference voltage;
   wherein a first circuit draws power from the second output voltage;
   the first output voltage is coupled to a second circuit; and
   the second circuit draws power solely from the first output voltage.

2. The voltage regulating power supply of claim 1, wherein a value of the second output voltage is substantially less than a value of the supply voltage level.

3. The voltage regulating power supply of claim 1, wherein the switching regulator is coupled to the linear regulator in series.

4. The voltage regulating power supply of claim 1 being implemented as a single integrated circuit.

5. The voltage regulating power supply of claim 1, wherein the second reference voltage is within a predetermined range in accordance to the first reference voltage.

6. The voltage regulating power supply of claim 1, wherein the first circuit is a radio frequency (RF) device.

7. The voltage regulating power supply of claim 6, wherein the radio frequency (RF) device comprises a synthesizer unit for generating a channel frequency corresponding to a selected channel of the radio frequency (RF) device, the synthesizer solely drawing power from the second output voltage.

8. The voltage regulating power supply of claim 7, wherein the radio frequency (RF) device further comprises a receiver, the receiver being coupled to the synthesizer for receiving the channel frequency generated by the synthesizer.

9. The voltage regulating power supply of claim 7 wherein the radio frequency (RF) device further comprises a transmitter, the transmitter being coupled to the synthesizer for receiving the channel frequency generated by the synthesizer.

10. The voltage regulating power supply of claim 1, wherein the first circuit is a high speed analog-to-digital converter (ADC).

11. The voltage regulating power supply of claim 1, wherein the first circuit is a phase-lock loop (PLL) circuit.

12. The voltage regulating power supply of claim 1, wherein a value of the first reference voltage is greater than a value of the second reference voltage.

13. A method of voltage regulation in a power supply, the method comprising:
   generating a first output voltage in accordance to a first reference voltage utilizing a switching regulator powered by a supply voltage level;
   generating a second output voltage in accordance to a second reference voltage utilizing a linear regulator coupled to the first output voltage;
   drawing power from the second output voltage by a first circuit; and
   drawing power solely from the first output voltage by a second circuit.

14. The voltage regulating power supply of claim 1, wherein the first circuit is isolated from the switching regulator.

15. The method of claim 13, further comprising isolating the first circuit from the switching regulator.

16. The voltage regulating power supply of claim 1, wherein only the first circuit draws power from the second output voltage.

17. The method of claim 13, further comprising drawing power from the second output voltage only by the first circuit.

18. The voltage regulating power supply of claims 1, wherein the switching regulator is for generating the first output voltage to be substantially equivalent in voltage level to the first reference voltage.

19. The method of claims 13, further comprising generating the first output voltage utilizing the switching regulator to be substantially equivalent in voltage level to the first reference voltage.

20. The voltage regulating power supply of claim 1, wherein the second output voltage outputted by the linear regulator is isolated from the first output voltage outputted by the switching regulator.

21. The method of claim 13, further comprising isolating the second output voltage outputted by the linear regulator from the first output voltage outputted by the switching regulator.

22. The voltage regulating power supply of claims 1, wherein the switching regulator receives an input voltage, a conversion range is between the input voltage and the second output voltage, a difference between the first reference voltage and the second reference voltage is within a predetermined range, and the conversion range is mostly determined by the switching regulator.

23. The voltage regulating power supply of claims 1, wherein the second circuit is a digital circuit.

* * * * *